(12) United States Patent
Steffes et al.

(10) Patent No.: US 11,142,126 B2
(45) Date of Patent: Oct. 12, 2021

(54) INTERIOR REARVIEW MIRROR ASSEMBLY

(71) Applicant: Magna Mirrors of America, Inc., Holland, MI (US)

(72) Inventors: Matthew V. Steffes, Hopkins, MI (US); Peter Krebs, Moembris (DE)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 79 days.

(21) Appl. No.: 16/747,897

(22) Filed: Jan. 21, 2020

(65) Prior Publication Data

US 2020/0238913 A1    Jul. 30, 2020

Related U.S. Application Data

(60) Provisional application No. 62/915,224, filed on Oct. 15, 2019, provisional application No. 62/796,612, filed on Jan. 25, 2019.

(51) Int. Cl.

| | |
|---|---|
| *B60R 1/04* | (2006.01) |
| *B60R 1/12* | (2006.01) |
| *B60R 11/02* | (2006.01) |
| *G02B 7/182* | (2021.01) |
| *B29C 45/14* | (2006.01) |

(Continued)

(52) U.S. Cl.
CPC .......... *B60R 1/04* (2013.01); *B29C 45/14754* (2013.01); *B60R 1/12* (2013.01); *B60R 1/1207* (2013.01); *B60R 11/0229* (2013.01); *G02B 7/1824* (2013.01); *B29C 2045/14967* (2013.01); *B29L 2011/0058* (2013.01); *B29L 2031/30* (2013.01); *B60R 2001/1215* (2013.01); *B60R 2011/0033* (2013.01)

(58) Field of Classification Search
CPC . B60R 1/04; B60R 1/1207; B60R 2001/1215; B60R 1/12; G02B 7/1824
USPC .......................................... 359/833; 362/494
See application file for complete search history.

(56) References Cited

U.S. PATENT DOCUMENTS 2,600,751 A * 6/1952 Gazda ..................... B60Q 1/34
                                                                362/494
3,928,894 A    12/1975 Bury et al.
(Continued)

FOREIGN PATENT DOCUMENTS

DE          10060447 A1     6/2002
DE          10256835 A1     6/2004
(Continued)

*Primary Examiner* — Ricky D Shafer
(74) *Attorney, Agent, or Firm* — Honigman LLP

(57) ABSTRACT

A method of assembling a mirror head for a vehicular interior rearview mirror assembly includes providing a mirror casing, a mirror reflective element at the mirror casing, and a toggle mechanism, which includes a body portion and a toggle lever joined to the body portion. A lower pivot mount of the toggle mechanism is inserted into a lower receiving portion of the mirror casing and an upper pivot mount of the toggle mechanism is inserted into an upper receiving portion of the mirror casing. An outer surface of the body portion corresponds with adjacent outer surfaces of the mirror casing, and, when the toggle lever pivots relative to the lower receiving portion of the mirror casing, the mirror casing pivots relative to the body portion to flip the mirror head between a first orientation and a second orientation.

15 Claims, 18 Drawing Sheets

(51) Int. Cl.
*B60R 11/00* (2006.01)
*B29L 31/30* (2006.01)
*B29L 11/00* (2006.01)

(56) References Cited

U.S. PATENT DOCUMENTS

| | | | |
|---|---|---|---|
| 4,435,042 A | 3/1984 | Wood et al. | |
| 4,436,371 A | 3/1984 | Wood et al. | |
| 4,826,289 A | 5/1989 | Vandenbrink et al. | |
| 4,936,533 A | 6/1990 | Adams et al. | |
| 4,948,242 A | 8/1990 | Desmond et al. | |
| 4,977,487 A * | 12/1990 | Okano | B60Q 1/2661 362/555 |
| 5,100,095 A | 3/1992 | Haan et al. | |
| 5,327,288 A | 7/1994 | Wellington et al. | |
| 5,377,948 A | 1/1995 | Suman et al. | |
| 5,530,240 A * | 6/1996 | Larson | B60R 1/088 250/214 AL |
| 5,555,136 A | 9/1996 | Waldmann et al. | |
| 5,582,383 A | 12/1996 | Mertens et al. | |
| 5,680,263 A | 10/1997 | Zimmermann et al. | |
| 5,798,688 A | 8/1998 | Schofield | |
| 5,820,097 A | 10/1998 | Spooner | |
| 5,931,440 A | 8/1999 | Miller | |
| 5,984,482 A | 11/1999 | Rumsey et al. | |
| 6,042,076 A | 3/2000 | Moreno | |
| 6,227,675 B1 | 5/2001 | Mertens et al. | |
| 6,229,319 B1 | 5/2001 | Johnson | |
| 6,315,421 B1 | 11/2001 | Apfelbeck et al. | |
| 6,318,870 B1 | 11/2001 | Spooner et al. | |
| 6,329,925 B1 | 12/2001 | Skiver et al. | |
| 6,439,755 B1 | 8/2002 | Fant, Jr. et al. | |
| 6,483,438 B2 | 11/2002 | DeLine et al. | |
| 6,501,387 B2 | 12/2002 | Skiver et al. | |
| 6,540,193 B1 | 4/2003 | DeLine | |
| 6,593,565 B2 | 7/2003 | Hestin et al. | |
| 6,598,980 B2 | 7/2003 | Marusawa et al. | |
| 6,690,268 B2 | 2/2004 | Schofield et al. | |
| 6,824,281 B2 | 11/2004 | Schofield et al. | |
| 6,877,709 B2 | 4/2005 | March et al. | |
| 7,184,190 B2 | 2/2007 | McCabe et al. | |
| 7,229,197 B2 * | 6/2007 | Tanaka | B60Q 1/2665 362/494 |
| 7,249,860 B2 | 7/2007 | Kulas et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,338,177 B2 * | 3/2008 | Lynam | B60R 1/12 340/425.5 |
| 7,360,932 B2 | 4/2008 | Uken et al. | |
| 7,420,756 B2 | 9/2008 | Lynam | |
| 7,626,749 B2 | 12/2009 | Baur et al. | |
| 8,049,640 B2 | 11/2011 | Uken et al. | |
| 8,277,059 B2 | 10/2012 | McCabe et al. | |
| 8,451,332 B2 | 5/2013 | Rawlings | |
| 8,503,061 B2 | 8/2013 | Uken et al. | |
| 8,508,831 B2 | 8/2013 | De Wind et al. | |
| 8,529,108 B2 | 9/2013 | Uken et al. | |
| 8,608,335 B2 * | 12/2013 | Rooms | F21S 8/04 362/147 |
| 8,730,553 B2 | 5/2014 | De Wind et al. | |
| 8,851,690 B2 | 10/2014 | Uken et al. | |
| 9,156,403 B2 | 10/2015 | Rawlings et al. | |
| 9,174,577 B2 | 11/2015 | Busscher et al. | |
| 9,333,916 B2 | 5/2016 | Uken et al. | |
| 9,346,403 B2 | 5/2016 | Uken et al. | |
| 9,475,431 B2 | 10/2016 | Brummel et al. | |
| 9,598,016 B2 | 3/2017 | Blank et al. | |
| 10,046,706 B2 | 8/2018 | Larson et al. | |
| 10,144,353 B2 | 12/2018 | Kamer et al. | |
| 10,166,924 B2 | 1/2019 | Baur | |
| 10,421,404 B2 * | 9/2019 | Larson | B60R 1/00 |
| 10,442,360 B2 | 10/2019 | LaCross et al. | |
| 10,538,201 B2 | 1/2020 | De Wind | |
| 10,744,944 B2 | 8/2020 | Steffes | |
| 2002/0024713 A1 * | 2/2002 | Roberts | H04B 1/3805 359/267 |
| 2004/0079853 A1 | 4/2004 | Suzuki et al. | |
| 2005/0164541 A1 | 7/2005 | Joy et al. | |
| 2005/0281043 A1 * | 12/2005 | Eisenbraun | B60Q 1/2665 362/494 |
| 2007/0058257 A1 | 3/2007 | Lynam | |
| 2009/0040306 A1 | 2/2009 | Foote et al. | |
| 2009/0096235 A1 | 4/2009 | Tanaka et al. | |
| 2009/0251785 A1 * | 10/2009 | Bruhnke | B60R 1/04 359/604 |
| 2010/0085653 A1 | 4/2010 | Uken et al. | |
| 2012/0236388 A1 * | 9/2012 | De Wind | B60R 1/12 359/267 |
| 2012/0268961 A1 * | 10/2012 | Cammenga | B60R 1/12 362/516 |
| 2013/0062497 A1 | 3/2013 | Van Huis et al. | |
| 2014/0226012 A1 | 8/2014 | Achenbach | |
| 2014/0313563 A1 | 10/2014 | Uken et al. | |
| 2015/0097955 A1 | 4/2015 | De Wind et al. | |
| 2015/0251605 A1 | 9/2015 | Uken et al. | |
| 2015/0334354 A1 | 11/2015 | Uken et al. | |
| 2017/0349102 A1 | 12/2017 | Habibi | |
| 2017/0355312 A1 | 12/2017 | Habibi et al. | |
| 2018/0297526 A1 | 10/2018 | Hennig et al. | |
| 2019/0039519 A1 | 2/2019 | Blakeman et al. | |
| 2019/0118713 A1 | 4/2019 | Steffes | |
| 2019/0118717 A1 | 4/2019 | Blank et al. | |
| 2019/0146297 A1 | 5/2019 | Lynam et al. | |
| 2019/0258131 A9 | 8/2019 | Lynam et al. | |
| 2019/0351830 A1 * | 11/2019 | Bosma | B60R 1/081 |
| 2020/0377022 A1 | 12/2020 | LaCross et al. | |
| 2021/0155167 A1 | 5/2021 | Lynam et al. | |
| 2021/0162926 A1 | 6/2021 | Lu | |

FOREIGN PATENT DOCUMENTS

| | | |
|---|---|---|
| DE | 102008011871 A1 | 9/2009 |
| DE | 102010010571 A1 | 9/2011 |
| EP | 2048030 A2 | 4/2009 |
| JP | 2009096227 A | 5/2009 |
| WO | 2017168316 A1 | 10/2017 |

* cited by examiner

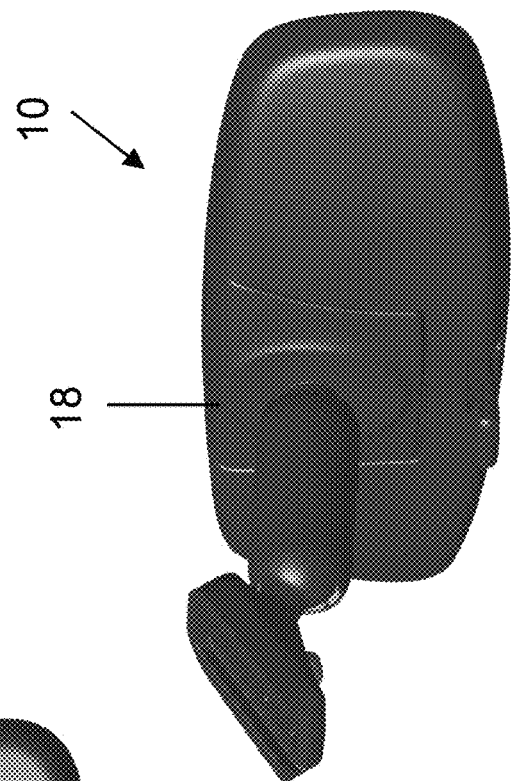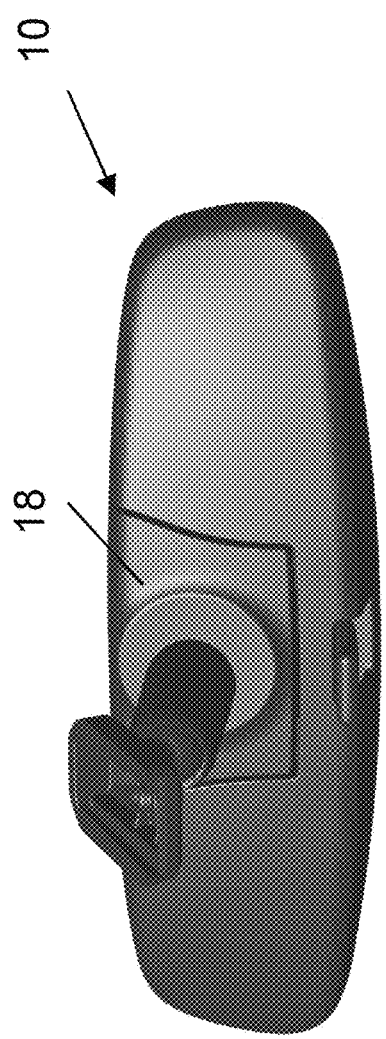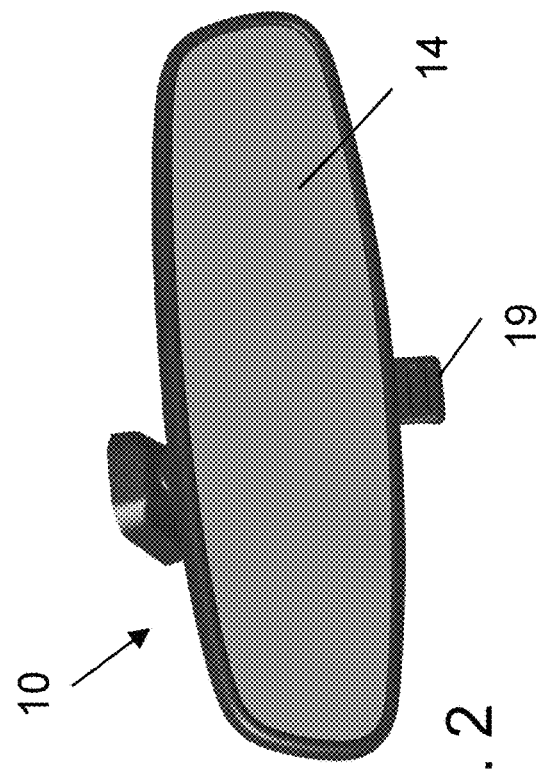

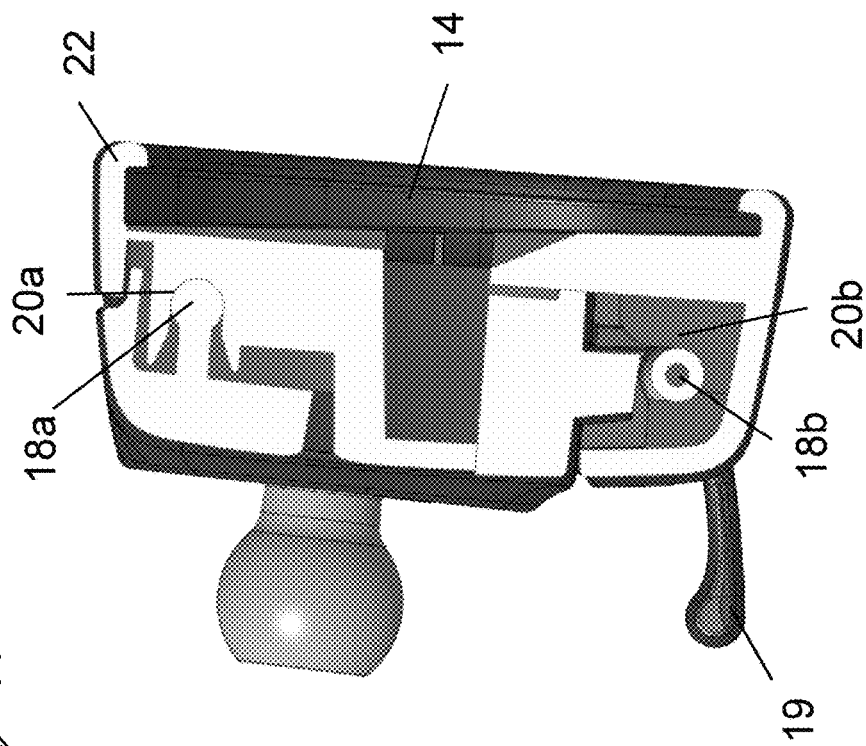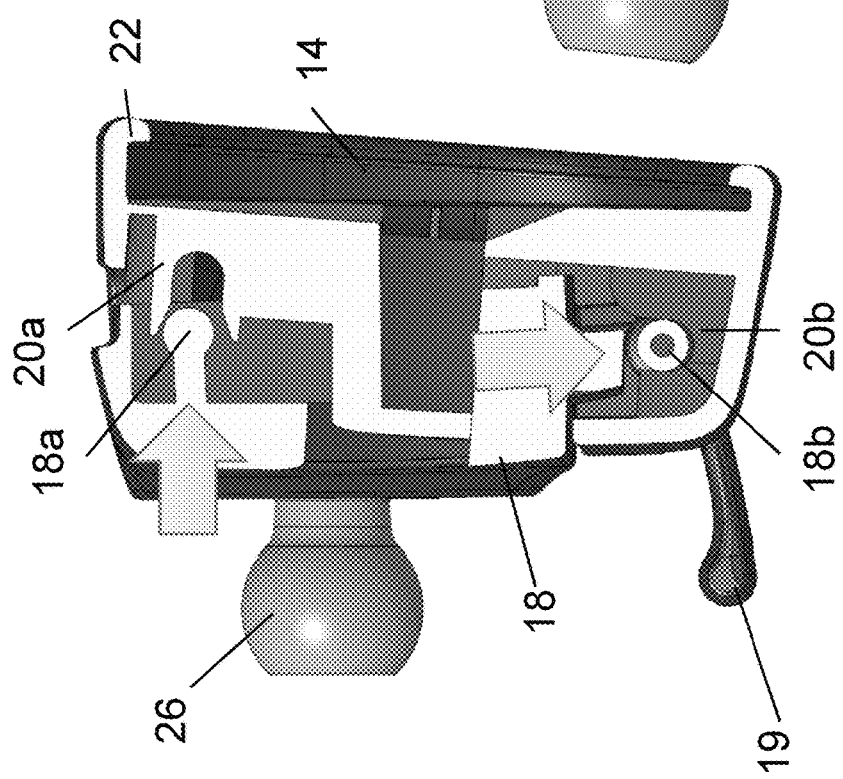

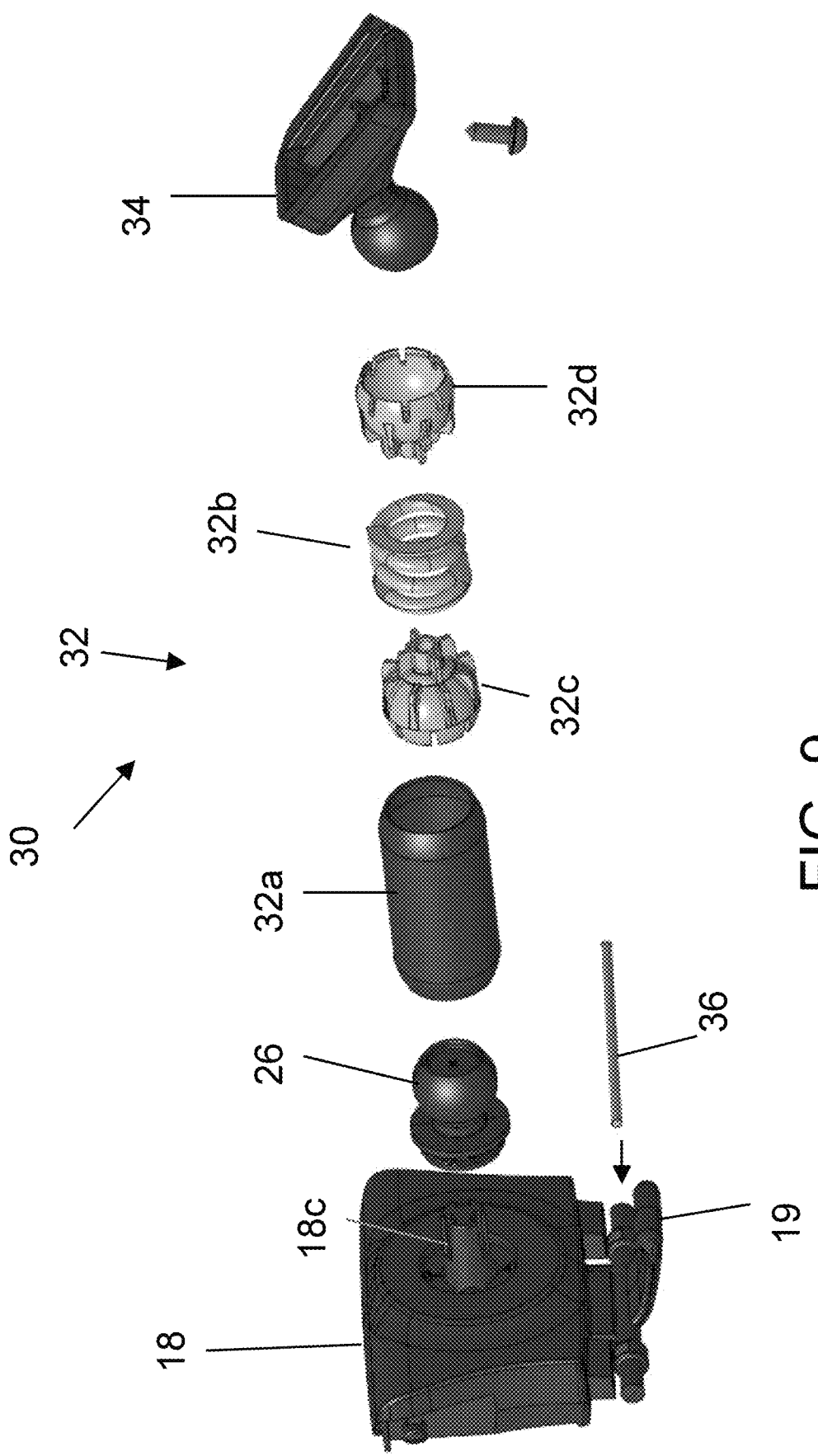

Polypropylene fills die-cast ball stud cavity, designed to tether mirror head during impact test.

Thin wall die-cast ball stud, designed to break at circled locations during 45° impact test.

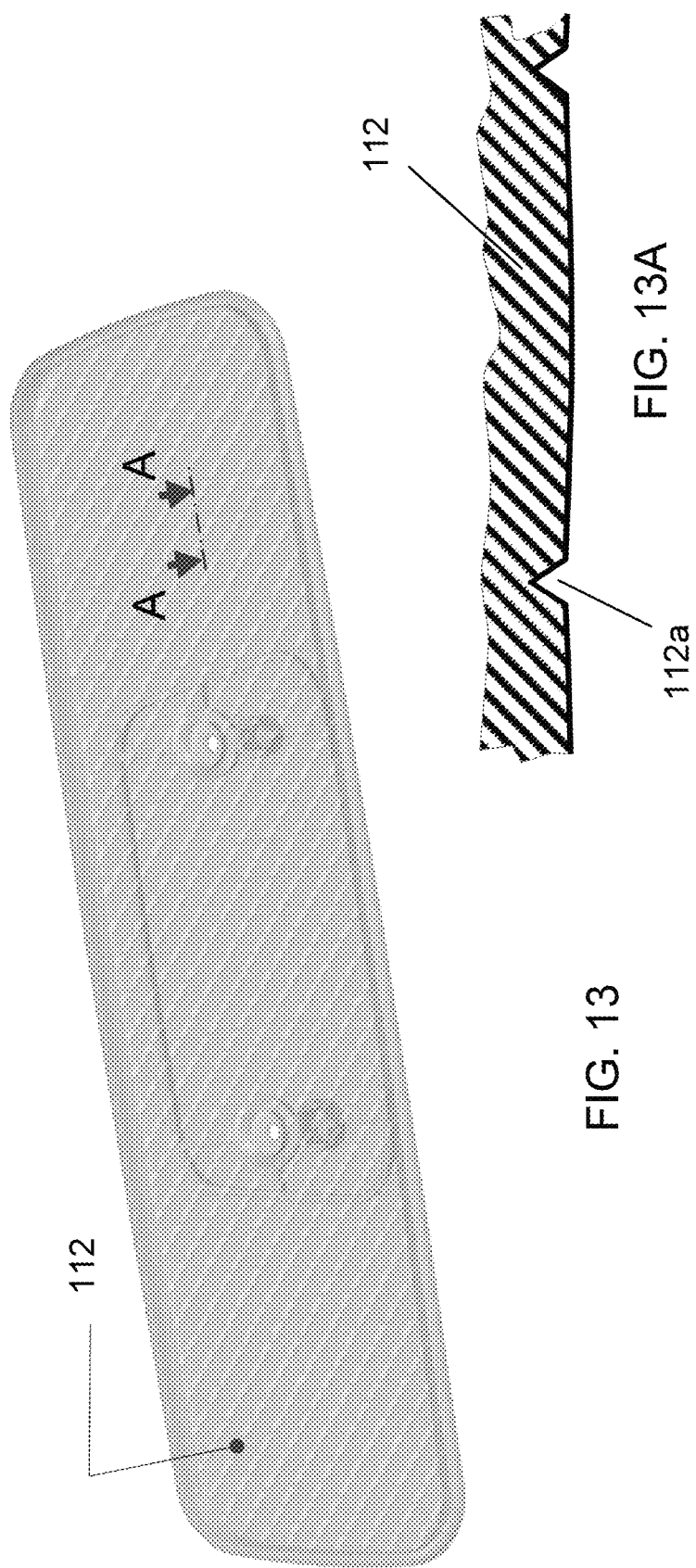

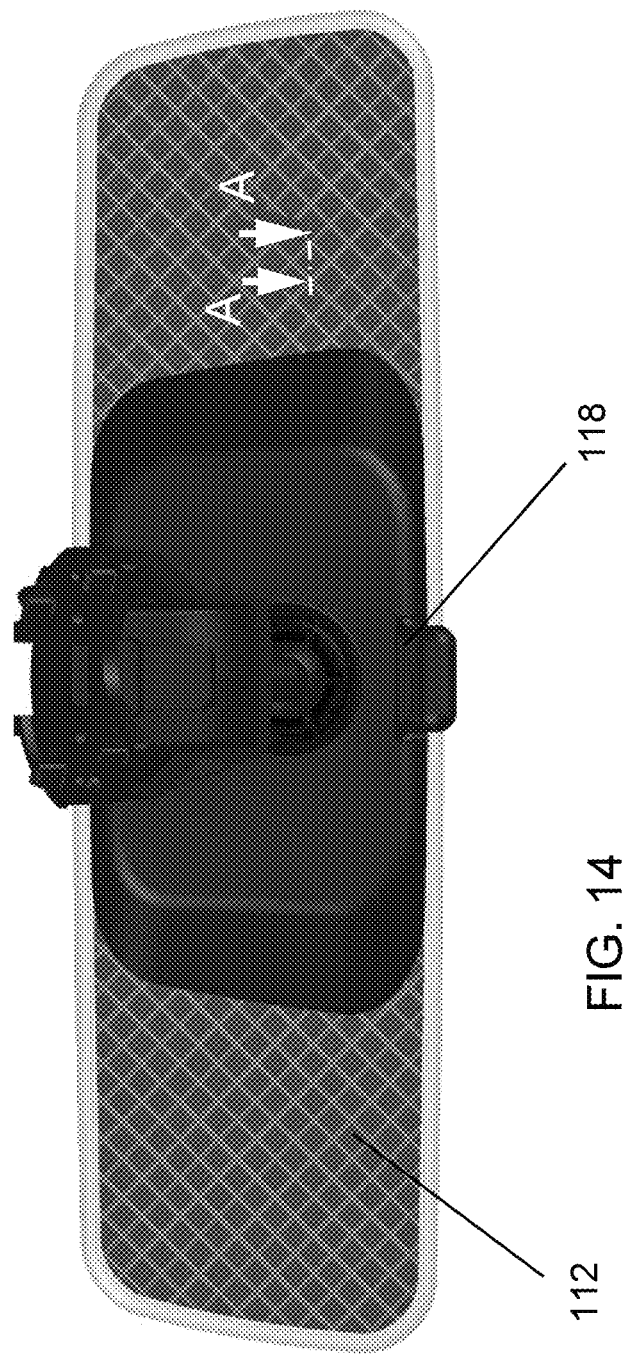
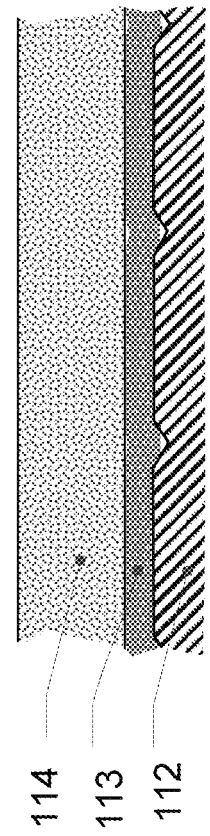
FIG. 14
FIG. 14A

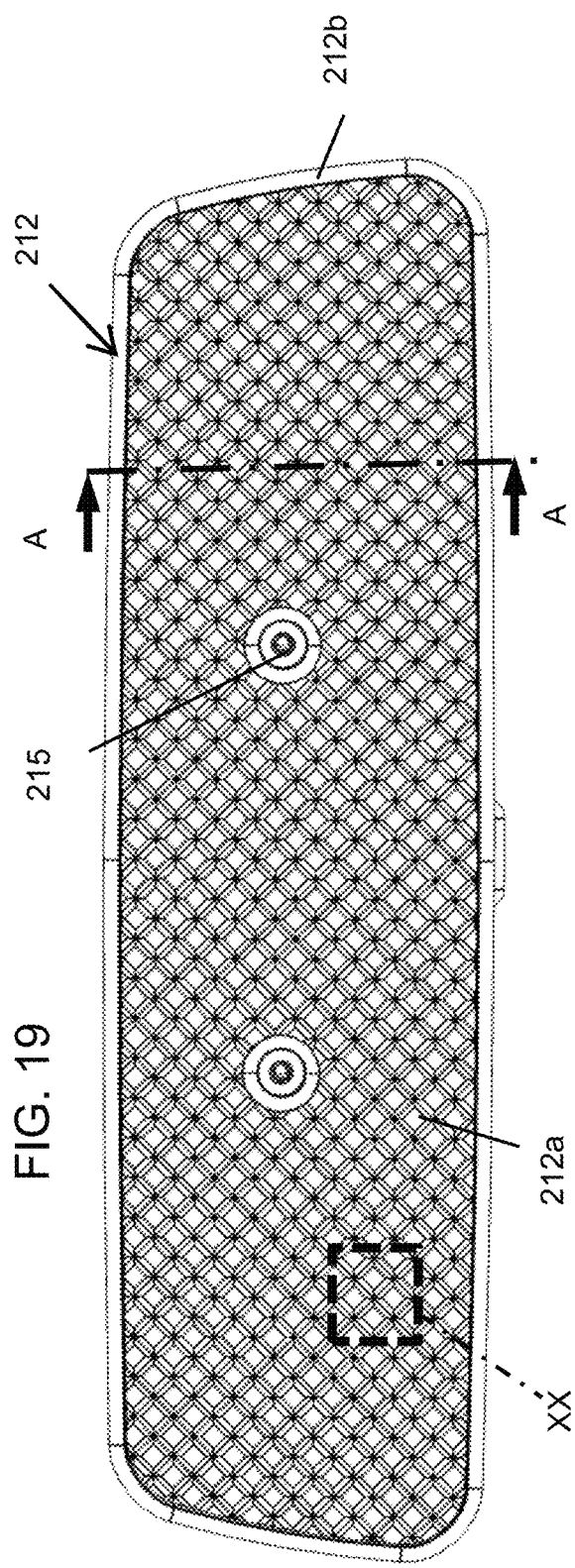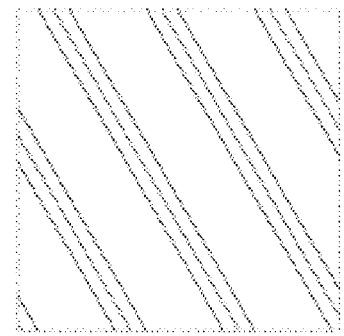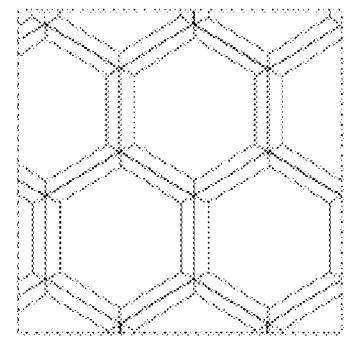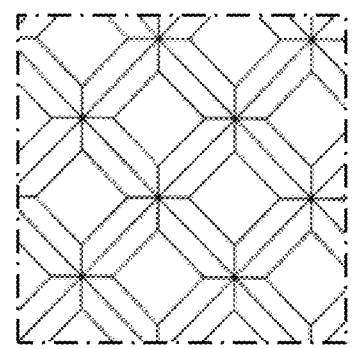
FIG. 19
FIG. 20C
FIG. 20B
FIG. 20A

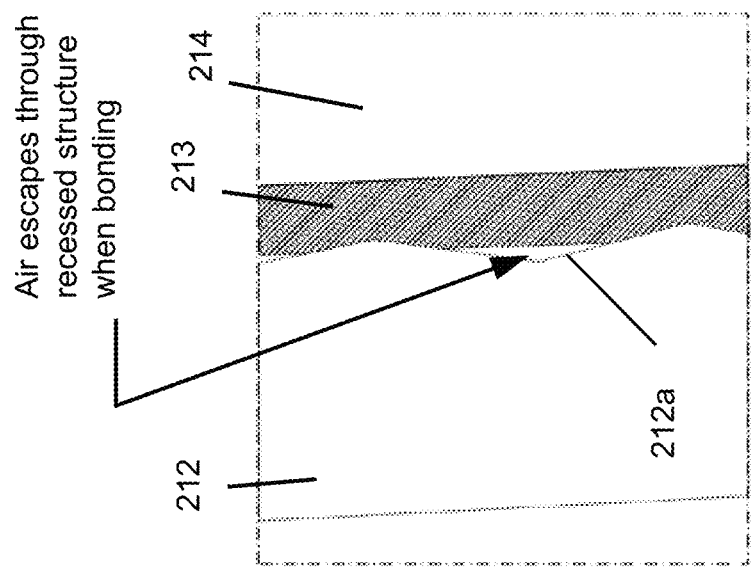
FIG. 19C
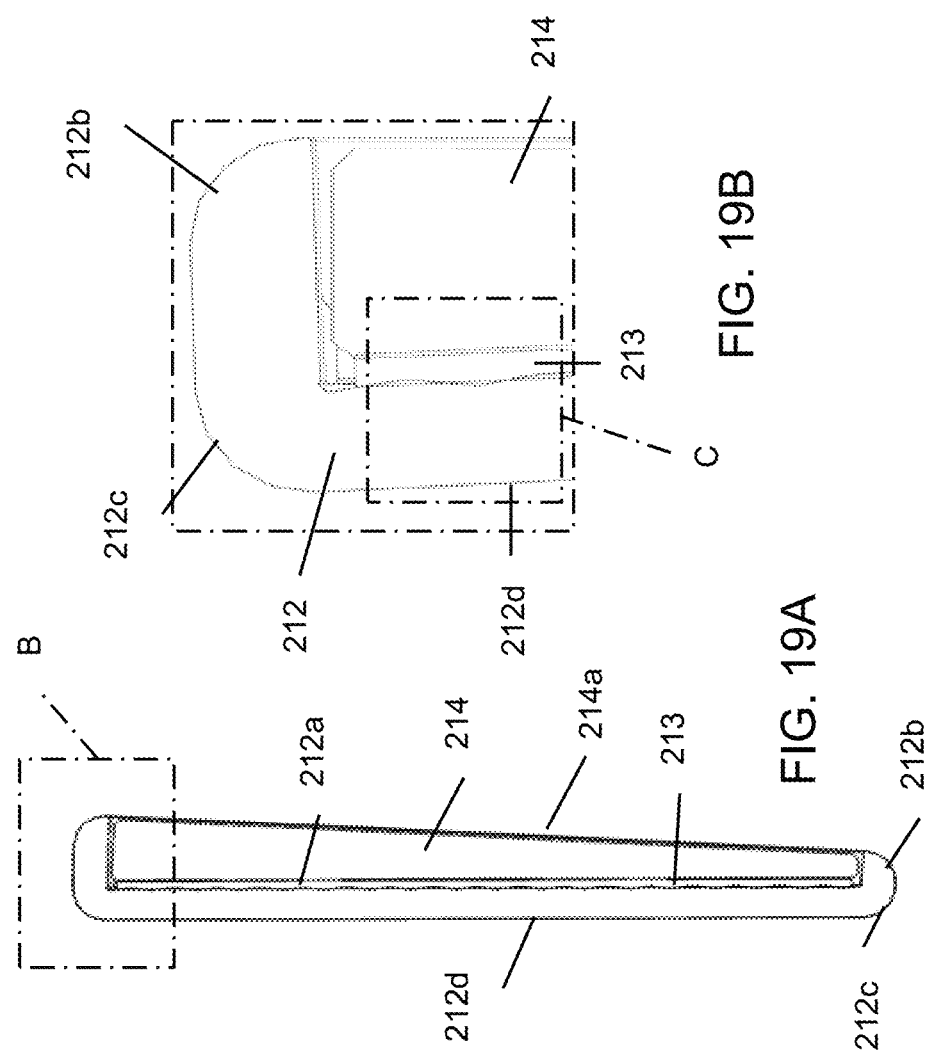
FIG. 19B
FIG. 19A

INTERIOR REARVIEW MIRROR ASSEMBLY

CROSS REFERENCE TO RELATED APPLICATIONS

The present application claims priority of U.S. provisional application Ser. No. 62/915,224, filed Oct. 15, 2019, and U.S. provisional application Ser. No. 62/796,612, filed Jan. 25, 2019, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide an interior mirror assembly with a prismatic reflective element that may be manually toggled between daytime and nighttime reflectivity positions. An example of such is described in U.S. Pat. No. 6,318,870, which is hereby incorporated herein by reference in its entirety.

SUMMARY OF THE INVENTION

The present invention provides an interior rearview mirror assembly that includes a prismatic reflective element and a mirror casing with a toggle mechanism or assembly that adjusts the viewing angle of the prismatic reflective element. During assembly of the mirror head, the toggle mechanism is attached at the mirror casing at the front side of the mirror head (the side that faces forward relative to the vehicle when the mirror assembly is installed in the vehicle). The assembled mirror head is mounted via attachment of a mounting structure or feature of the toggle mechanism at a mounting base or mirror mount that is disposed at an interior portion of a vehicle so as to pivotally or adjustably mount the mirror head at the mirror mount disposed at the interior portion of the vehicle.

The present invention also provides an interior rearview mirror assembly for a vehicle including a transparent mirror frame. The transparent mirror frame has a patterned front surface and a rear surface opposite the front surface. A reflective element is attached at the patterned front surface via adhesive disposed between and the patterned front surface of the transparent mirror frame and a rear surface of the reflective element. The patterned front surface includes a pattern of grooves to allow air between the adhesive and the patterned front surface to escape when the reflective element is attached and light-refracting or light-reflecting channels. The interior rearview mirror assembly also includes a mounting assembly mounted at the rear surface of the transparent mirror frame and configured to mount the interior rearview mirror assembly at an interior portion of a vehicle. Optionally, the interior rearview mirror assembly includes a light-emitting illumination source disposed at a central region of the transparent mirror frame of the mounting assembly. The patterned front surface may be patterned to reflect and refract light emitted by the illumination source, when powered, so that an illumination pattern is visible to a person viewing the rear of the transparent mirror frame.

These and other objects, advantages, purposes and features of the present invention will become apparent upon review of the following specification in conjunction with the drawings.

BRIEF DESCRIPTION OF THE DRAWINGS

FIGS. 2-4 are perspective views of the interior rearview mirror assembly;

FIGS. 7 and 8 are sectional views of the mirror head, showing the mounting of the toggle mechanism at the mirror casing;

FIG. 9 is an exploded perspective view of the two ball mirror mount assembly attached at the rear of the toggle mechanism;

FIG. 13 is a rear perspective view of the transparent frame of the mirror assembly of FIG. 12;

FIG. 13A is a sectional view of a portion of the transparent frame taken along the line A-A in FIG. 13;

FIG. 14 is a rear plan view of the mirror assembly, with the reflective element adhered to the clear frame;

FIG. 14A is a sectional view of a portion of the mirror assembly taken along the line A-A in FIG. 14;

FIG. 19 is a plan view of another transparent frame, showing the textured pattern at its front surface;

FIG. 19A is a sectional view of the transparent frame taken along the line A-A in FIG. 19, shown with the reflective element bonded at the front surface;

FIG. 19B is an enlarged view of the upper portion of the transparent frame and reflective element of FIG. 19A;

FIG. 19C is an enlarged view of the area C in FIG. 19B;

FIGS. 20A-C illustrate exemplary patterns for the bonding surface of the transparent frame, showing different patterns for the area XX in FIG. 19;

DESCRIPTION OF THE PREFERRED EMBODIMENTS

Figure 1:
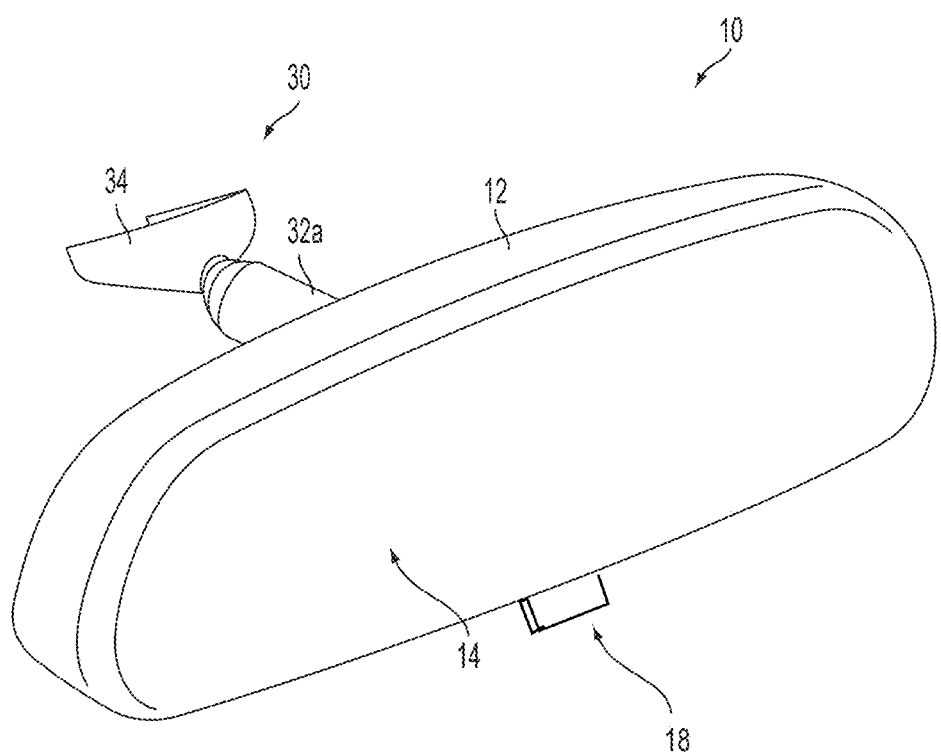
FIG. 1 is a perspective view of an interior rearview mirror assembly in accordance with the present invention.

Referring now to the drawings and the illustrative embodiments depicted therein, an interior rearview mirror assembly 10 for a vehicle includes a casing 12 and a reflective element 14 positioned at an interior-facing portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 30. The mirror reflective element comprises a prismatic mirror reflective element that is flipped between a daytime position and a nighttime position via a toggle element or mechanism 18 (discussed below). The mirror assembly may utilize aspects of the mirror assemblies described in U.S. Publication No. US-2019-0118713, which is hereby incorporated herein by reference in its entirety.

In the illustrated embodiment, the mirror reflective element comprises a prismatic reflective element that is flippable between a daytime position and a nighttime position. The mirror assembly comprises a receiving structure 20 at its opposite side for receiving the toggle mechanism or structure 18 thereat. As shown in FIGS. 5-8, the toggle mechanism 18 is loaded from the forward or windshield side (the side facing forward in the vehicle when the mirror assembly is mounted at the vehicle) of the housing (opposite side of the reflective element) during assembly. The mirror casing 12 includes a bezel portion 22 that receives and retains the reflective element at the mirror casing. Optionally, the mirror assembly may comprise a frameless and/or low profile mirror head (such as by utilizing aspects of the mirror assemblies described in U.S. Publication No. US-2015-0334354, which is hereby incorporated herein by reference in its entirety), with a casing or housing or mirror support element that has attachment surfaces at which the mirror reflective element is adhered.

Figure 5:
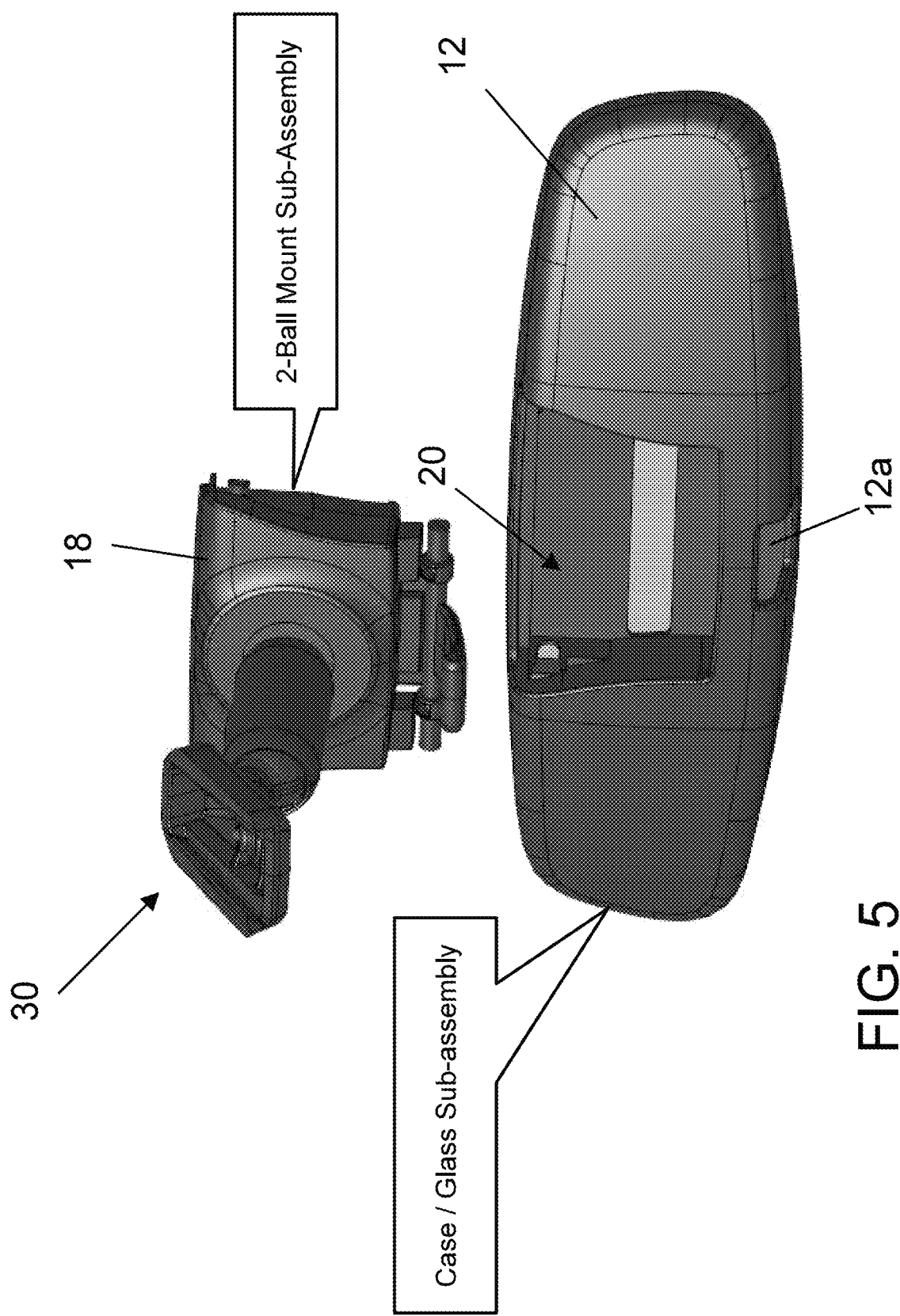
FIGS. 5 and 6 are exploded perspective views of the mirror head and the toggle mechanism, shown with the toggle mechanism attached at a two ball mirror mount assembly.
Figure 6:
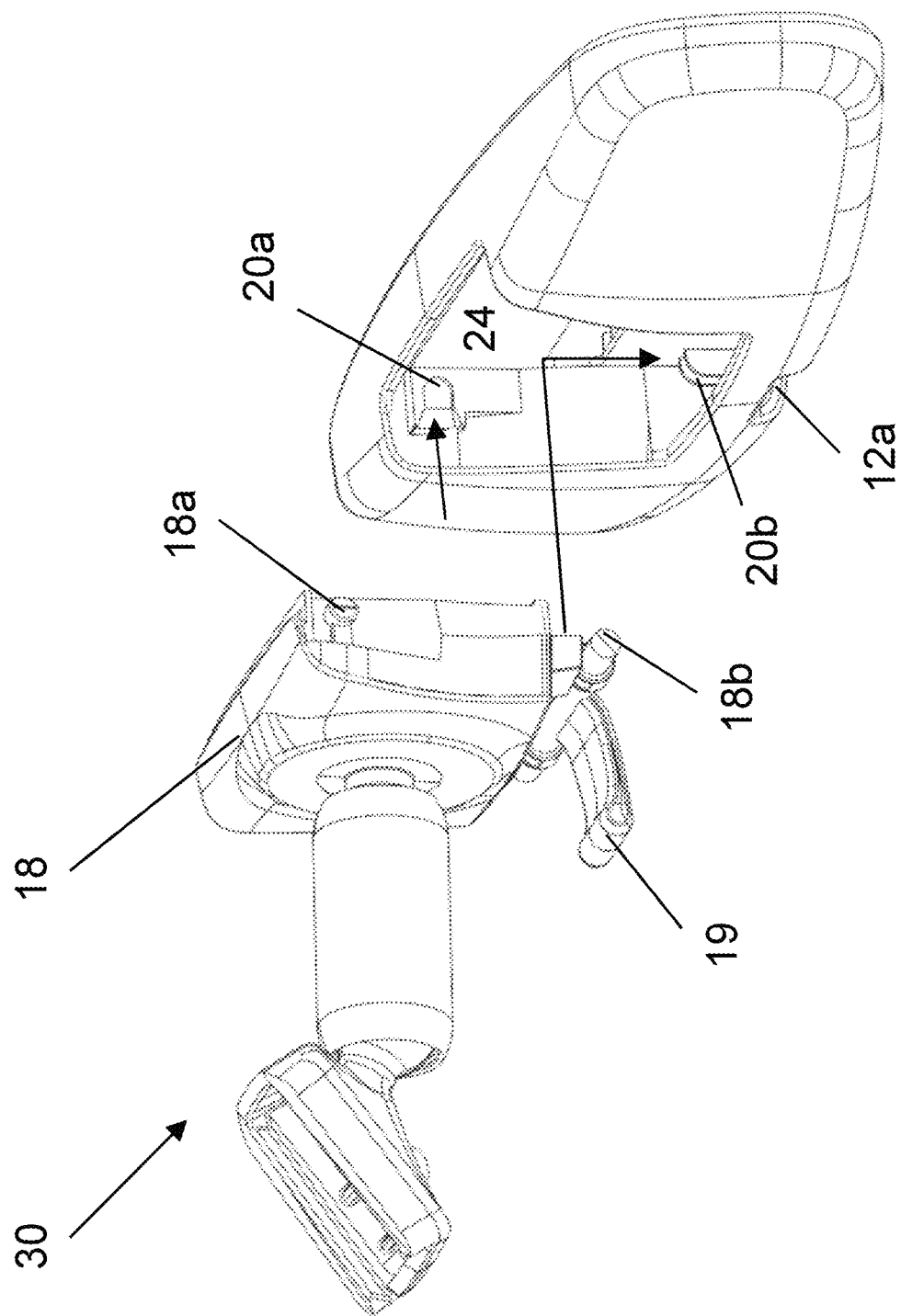

As can be seen in FIGS. 5-7, the receiving structure 20 comprises a recessed area with a pair of upper slots or journals or retaining features 20a that are configured to receive and retain (e.g., via flexible anti-backout tabs) upper posts or pins or pivot features 18a of the toggle mechanism 18. The recessed area also comprises a pair of lower retaining features or journals 20b that are configured to receive and retain lower posts or pins 18b of the toggle mechanism. Thus, during assembly of the mirror, the toggle tab 19 (FIG. 2) is inserted through an aperture 12a of the mirror casing, and the lower hinge pins 18b (above the tab) hook into the journal or retaining features 20b at the receiving structure 20 of the housing, and then the toggle mechanism pivots about a pivot axis of the lower hinge pins such that upper posts 18a (on either side above the socket) pivot and snap into the slots or journals 20a at the receiving structure 20. Optionally, the aperture at the lower part of the mirror casing may comprise a slot or recess that allows the toggle tab to be received thereat via movement of the toggle mechanism generally normal to the mirror casing wall (whereby the lower retaining features may be oriented generally horizontally to allow for such movement to move the lower pins into the retaining features). As shown in FIG. 8, when the toggle mechanism is attached at the mirror casing, with the top portion of the toggle seated to the mirror casing upper journal and with the bottom portion of the toggle seated to the mirror casing lower journal, the outer upper surface of the toggle mechanism is generally flush with the outer upper surface of the mirror casing.

Insertion of the toggle mechanism 18 from the back or windshield side (the side facing the vehicle windshield) of the mirror housing can allow for automation of the assembly process. Also, and as shown in FIGS. 5-7, the housing comprises a recessed area 24 at the center region of the toggle receiving structure 20. The mirror casing may provide cavities at either side of the center region, such as for receiving or accommodating a printed circuit board or other mirror content. As shown in FIG. 8, when the toggle mechanism 18 is attached at the receiving structure 20, the toggle mechanism substantially fills the center region and is at or near or abutted against the rear of the reflective element.

As shown in FIG. 9, the toggle mechanism 18 includes a post 18c that protrudes from the mirror casing and that is received in a metallic ball stud 26 that pivotally mounts the toggle mechanism and mirror head at a mounting assembly 30. The mounting assembly 30 includes a mounting arm or tube sub-assembly 32, which comprises a tube 32a that houses a spring 32b that is disposed between socket elements 32c, 32d, with socket element 32c pivotally receiving the ball stud 26 (having, for example, an 18 mm ball member) and socket element 32d pivotally receiving a ball member (e.g., an 18 mm ball) of a mirror mount 34, which is configured to mount to an interior portion of a vehicle, e.g., to a mirror mounting button at a windshield of a vehicle (and retained thereat via a fastener or the like). As also shown in FIG. 9, the toggle mechanism may include a pin 36, such as a metal spring pin or the like, that is insert molded into the shaft at the bottom of the toggle tab, e.g. at the pivot axis of the toggle tab. The metal pin may add strength and rigidity to the toggle mechanism.

Figure 10:
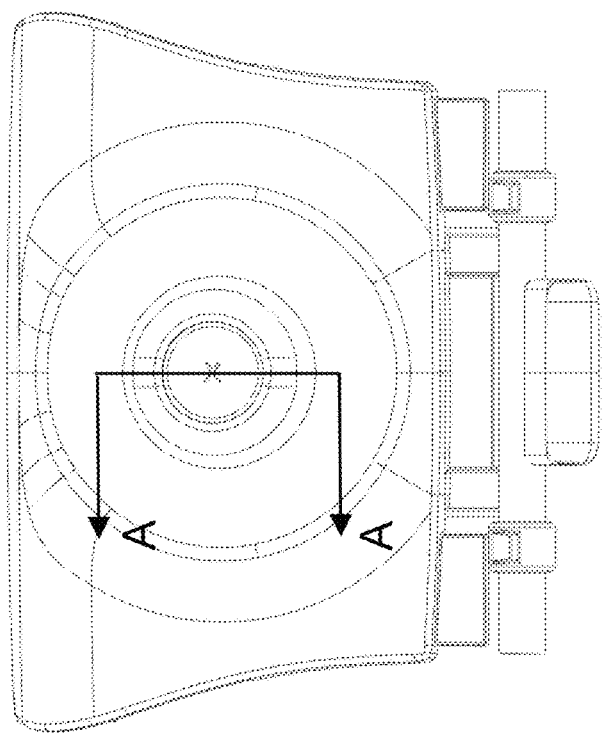
FIG. 10 is an end view of the assembled toggle mechanism and two ball mirror mount assembly.
Figure 10A:
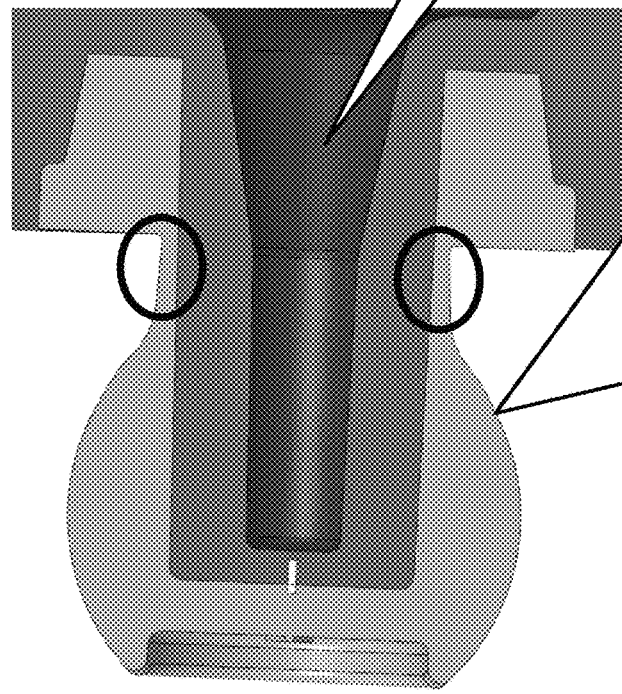
FIG. 10A is a sectional view of the ball stud and toggle mechanism taken along the line A-A in FIG. 10.

The ball stud 26 may comprise a die-cast ball stud (comprising zinc or other suitable material) that is insert molded into the toggle mechanism as shown in FIG. 10A. The toggle mechanism 18 may be molded via a two-shot molding process or insert mold or over mold such that a stiffer material (such as a Polyoxymethylene (POM) or acetal or the like) can be used for the assembly body and post, while a more flexible material (such as a Polypropylene (PP) or the like) may be used for the living hinge detail at the bottom of the molded toggle mechanism. The stiffer material for the main assembly body provides enhanced vibration stability performance for the mirror and more consistent manual efforts or torque on the ball and socket through temperature variations. The toggle body and socket thus may be molded of the stiffer polymeric material, and the flexible material may then be molded over the stiffer polymeric material to form the living hinge and other parts of the toggle mechanism.

As shown in FIG. 10A, the die-case ball stud may be formed with thin walls at the neck region, such that the ball stud fractures or breaks at the thinner neck region when the mirror is impacted. The injection molded polypropylene post of the toggle mechanism fills the ball stud cavity and functions to tether the mirror head to the mounting assembly when the ball stud breaks. The mirror assembly may utilize aspects of the mirror assemblies described in U.S. Publication No. US-2019-0039519, which is hereby incorporated herein by reference in its entirety.

Figure 11:
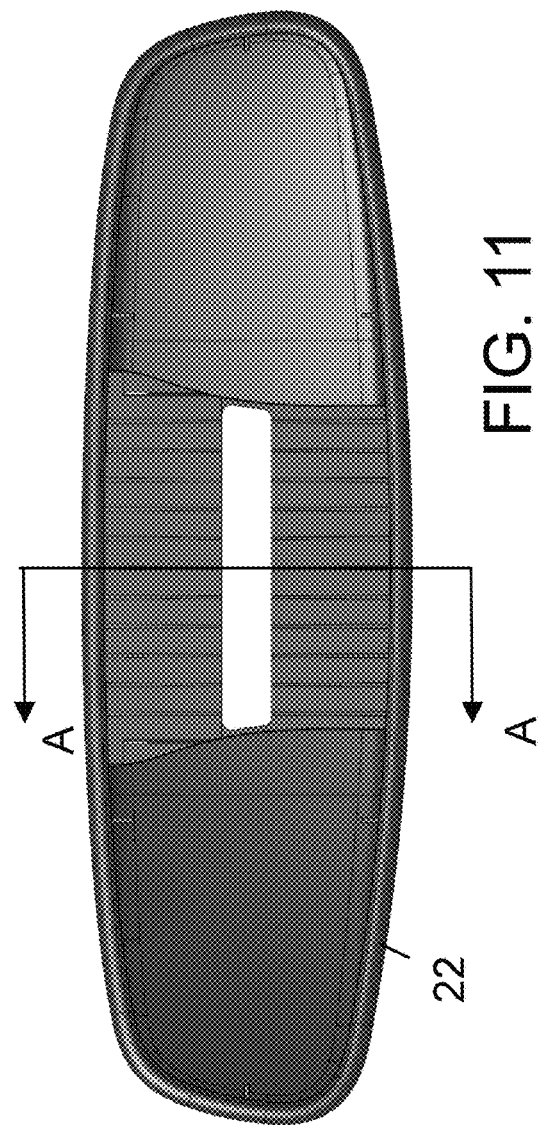
FIG. 11 is a plan view of the mirror casing.
Figure 11B:
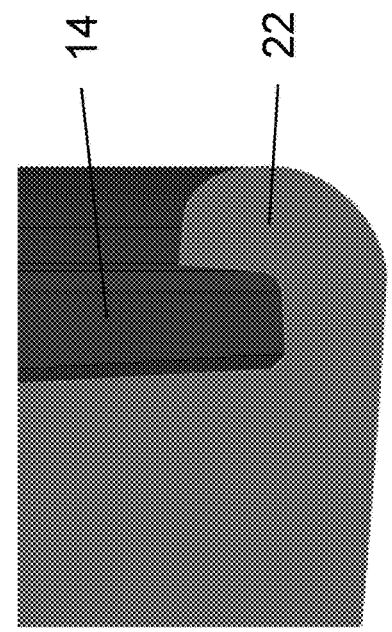
FIG. 11B is an enlarged sectional view of the area B in FIG. 11A.
Figure 11A:
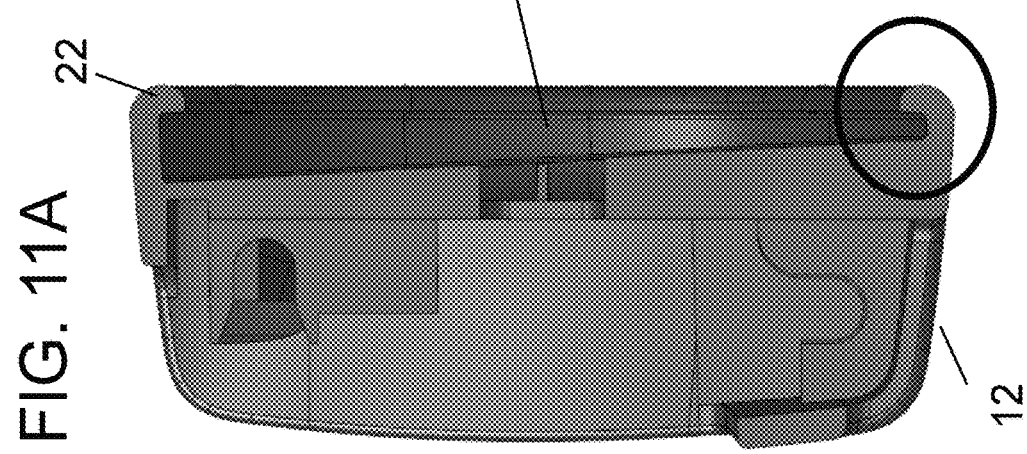
FIG. 11A is a sectional view of the mirror casing taken along the line A-A in FIG. 11.
Figures 12, 12A:
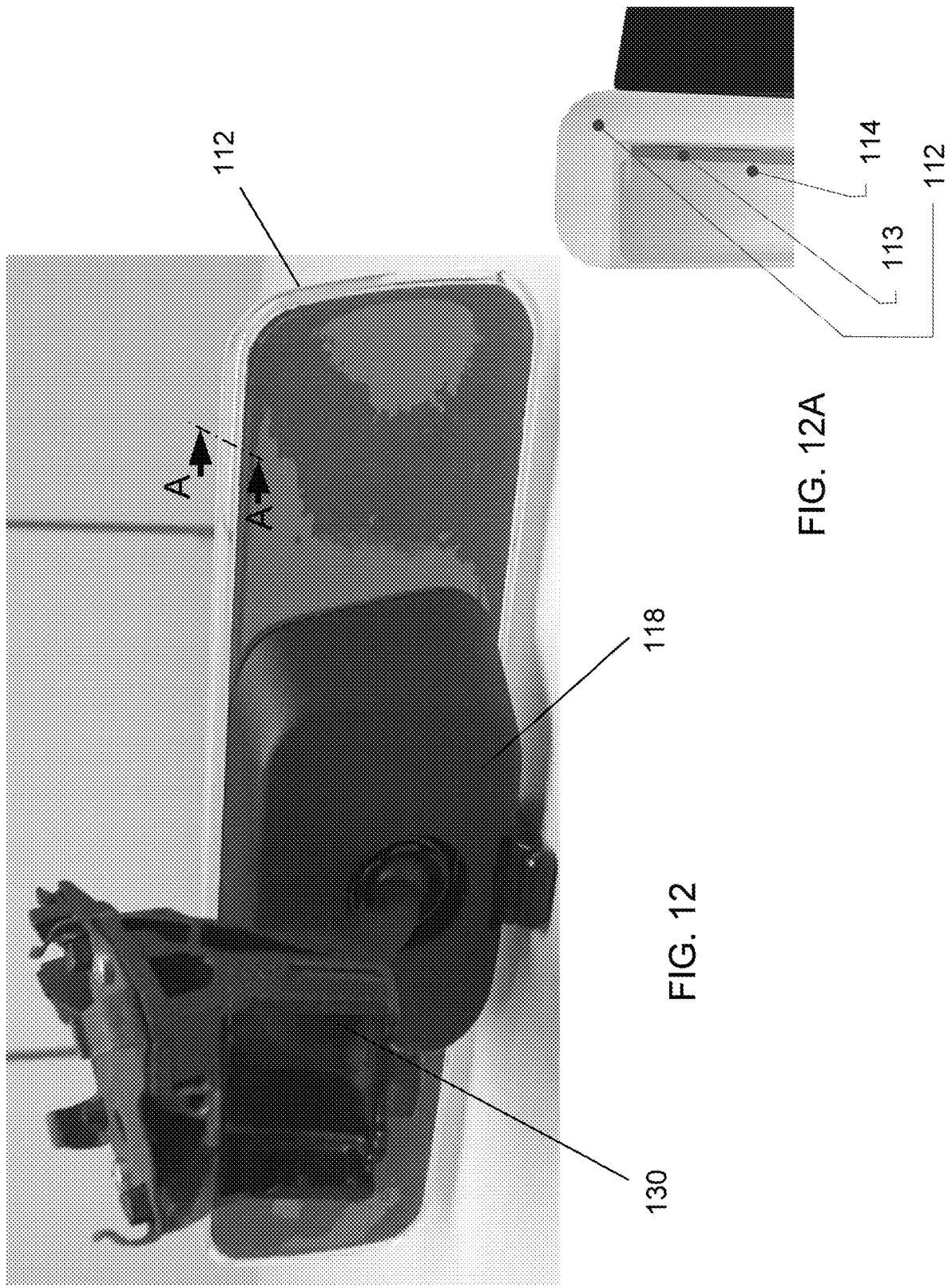
FIG. 12 is a rear perspective view of a clear or transparent frame low profile mirror assembly.
FIG. 12A is a sectional view of a portion of the mirror assembly taken along the line A-A in FIG. 12.

As shown in FIGS. 11, 11A and 11B, the bezel 22 is formed around the opening of the mirror casing and is formed to receive the prismatic or wedge-shaped glass substrate of the prismatic mirror reflective element 14 therein. The bezel lip holds the glass substrate at the mirror casing, with the toggle mechanism attached at the opposite side of the mirror casing from the bezel and reflective element.

Thus, the toggle mechanism and mirror housing provide for a reduction in number of parts (no back plate or fasteners needed) and easier assembly, since the toggle mechanism can readily snap into the receiving structure at the rear of the mirror housing.

In the home or daytime reflecting position, the toggle positions the mirror reflector surface of the prismatic reflective element 14 at a direct reflection viewing angle, which is intended to reflect more light toward the driver. In the actuated or angled or nighttime or glare reflecting position, the toggle positions the mirror reflector surface of the prismatic reflective element 14 at an offset reflection viewing angle, which provides a reduced glare and brightness of light reflected toward the driver's eyes, relative to the direct reflection viewing angle.

Although shown and described as providing a toggle mechanism for flipping a prismatic mirror reflective element between a daytime or non-glare reflecting position and a nighttime or glare reflecting position, the toggle mechanism may function to flip an electro-optic mirror reflective element (such as an electrochromic mirror reflective element having a laminate construction with an electrochromic medium sandwiched between a front glass substrate and a rear glass substrate) of a dual mode mirror assembly between a mirror reflecting position (where the driver views rearward via viewing reflected images at the mirror reflector of the electro-optic mirror reflective element) and a video display position (where the driver views video images displayed via a video display screen disposed behind the mirror reflective element and being viewed through a transflective mirror reflector of the mirror reflective element).

For example, the toggle mechanism may be utilized with a dual-mode interior rearview video mirror that can switch from a traditional reflection mode to a live-video display mode, such as by utilizing aspects of the mirror assemblies and systems described in U.S. Pat. Nos. 10,442,360; 10,421,404; 10,166,924 and/or 10,046,706, and/or U.S. Publication Nos. US-2019-0258131; US-2019-0146297; US-2019-0118717 and/or US-2017-0355312, and/or U.S. provisional application Ser. No. 62/945,262, filed Dec. 9, 2019, Ser. No. 62/942,351, filed Dec. 2, 2019, Ser. No. 62/941,089, filed Nov. 27, 2019, and/or Ser. No. 62/942,305, filed Dec. 2, 2019, which are all hereby incorporated herein by reference in their entireties.

In such dual-mode mirror assemblies, a video display screen is disposed behind substantially the entirety of the active reflective area of the mirror reflective element (such as, for example, greater than at least 80 percent or greater than at least 90 percent of the active reflective area of the mirror reflective element. When the mirror head is flipped to a rearward viewing or reflecting position or orientation, the driver of the vehicle views rearward of the vehicle via viewing reflection of light incident on the transflective mirror reflector, and when the mirror head is flipped to a video display position or orientation, the driver of the vehicle views video images displayed by the video display screen and viewable through the transflective mirror reflector.

Optionally, and with reference to FIGS. 12-18, the toggle mechanism may be part of a low profile or clear or transparent frame mirror assembly, where the toggle mechanism is attached at the center rear region of a frameless and caseless mirror reflective element. In such a mirror construction, the glass mirror substrate may be received in a clear or transparent plastic frame. In such a mirror construction, the glass substrate is adhered to an attachment surface of the frame via an adhesive tape, which can have air trapped at the glass (due to unevenness of the frame at the glass substrate). The transparent frame or mirror case may be formed to receive the reflective element in a recess, with a rounded lip that circumscribes the attachment surface and the perimeter edge of the mirror substrate, with the rounded lip providing a smooth or curved transition between the planar front surface of the glass substrate and a less-curved portion of the side surface of the lip and mirror frame, and with no part of the lip encroaching on or overlapping the planar front surface of the mirror substrate. Optionally, the perimeter region of the glass substrate may comprise a rounded surface, whereby the frame or case does not include the circumscribing lip and the rounded surface of the glass substrate provides the smooth transition between the planar front surface of the glass substrate and the side surface of the mirror frame. The mirror assembly may utilize aspects of the mirror assemblies described in U.S. Publication No. US-2019-0258131, which is hereby incorporated herein by reference in its entirety. The frame may be formed by a polymeric or plastic injection molding process, such as by injection molding a light-transmitting transparent polymeric material, such as a transparent or translucent polycarbonate material or a transparent or translucent polyacrylate material or the like.

In the illustrated embodiment of FIGS. 12-15, the mirror assembly comprises a transparent frame 112 that is formed to receive a mirror reflective element 114 thereat (such as in a recess formed at the interior or driver-facing side of the transparent frame). The toggle mechanism 118 attaches at the rear or opposite side of the transparent frame and pivotally mounts the mirror head at a mounting assembly 130. The transparent frame 112 (at which the reflective element 114 is bonded via an adhesive tape 113) has its bonding surface formed with a textured pattern, such as a rhombus pattern or square pattern or honey-comb pattern or the like, with grooves 112a (FIG. 13A) formed in that pattern across the bonding surface. Thus, any air trapped between the adhesive tape and the bonding surface can escape along the grooves.

Figure 17:
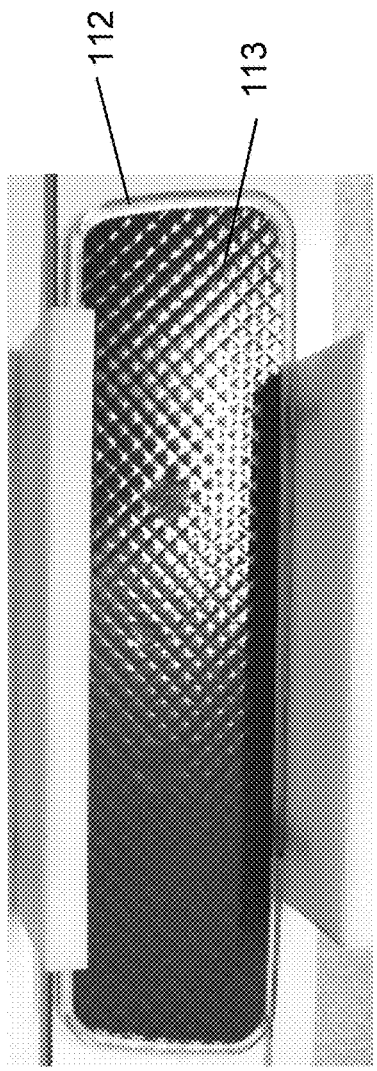
FIG. 17 is a plan view of the transparent frame with the adhesive tape laminated thereat.
Figure 18:
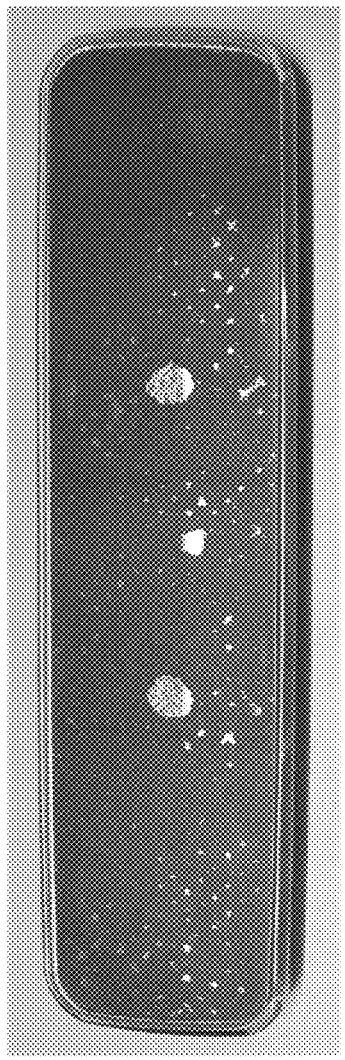
FIG. 18 is a plan view of the transparent frame with a clear glass substrate adhered thereat.
Figure 16:
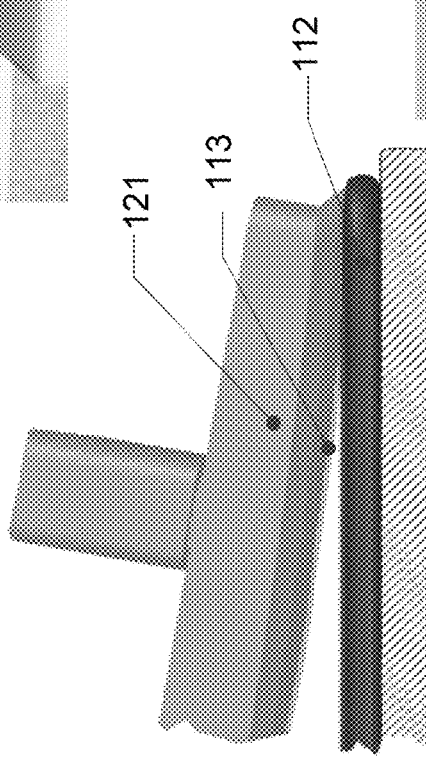
FIG. 16 is a view showing lamination of the adhesive tape at the frame via a curved stamp.

Optionally, and such as shown in FIG. 16, the adhesive tape 113 may be adhered or laminated onto the frame using a curved stamp 121, in order to further allow for air to escape during the bonding or laminating process. As shown in FIG. 17, with the adhesive tape bonded in the frame, the square-structure or pattern of the bonding surface of the frame emerges into the tape to provide enhanced bonding of the glass substrate at the tape. As shown in FIG. 18, only small areas of the adhesive tape do not contact the mirror glass substrate (shown in FIG. 18 without a mirror reflector so that the adhesive tape is viewable through the substrate), and such small areas would not be visible through the mirror reflector to a person viewing the mirror assembly.

Referring now to FIGS. 19 and 19A-C, a transparent frame 212 includes a textured pattern at its front surface 212a with a perimeter lip 212b that circumscribes the reflective element 214 and that comprises a rounded exterior curved surface that does not encroach or overlap the front surface 214a of the reflective element. As shown in FIG. 19A, the perimeter lip 212b of frame 212 provides a rounded curved transition from the planar front surface 214a of the reflective element 214, with a rear perimeter region 212c of the frame providing a rounded curved transition from a side region of the frame and lip to a generally planar rear surface 212d of the frame 212. The reflective element 214 thus is nested within the frame 212 and bonded to the front surface 212a via the adhesive tape 213. When the reflective element 214 is bonded to the textured front surface 212a of the frame 212, air can escape through the recessed structure to provide enhanced and uniform bonding of the tape 213 with the front surface 212a of the frame 212.

Figure 15:
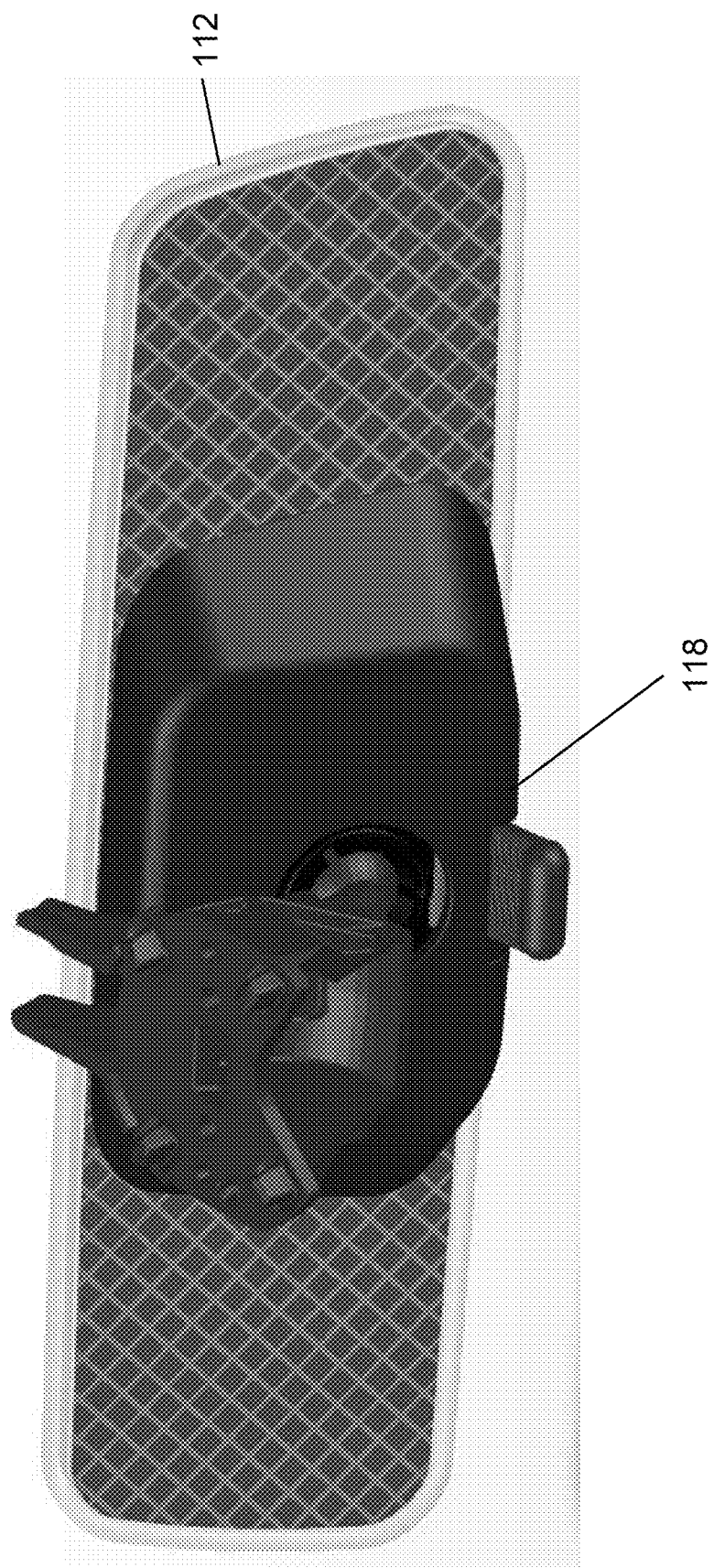
FIG. 15 is a rear perspective view of the mirror assembly of FIG. 14.

The textured pattern at the front surface 212a of the frame may comprise any suitable pattern that has a plurality of grooves or channels formed at the front surface. For example, the pattern may comprise a rectangular pattern or a rhombus pattern or structure (see FIGS. 19 and 20A), or the pattern may comprise a honeycomb structure (FIG. 20B), or the pattern may comprise a linear pattern or structure (FIG. 20C). The pattern is established over the entire bonding surface 212a, with the exception of mounting apertures or structure 215 established at or near a center region of the frame for attaching the mounting assembly (such as a mounting assembly including a toggle assembly such as shown in FIG. 15) thereat.

Figure 21:
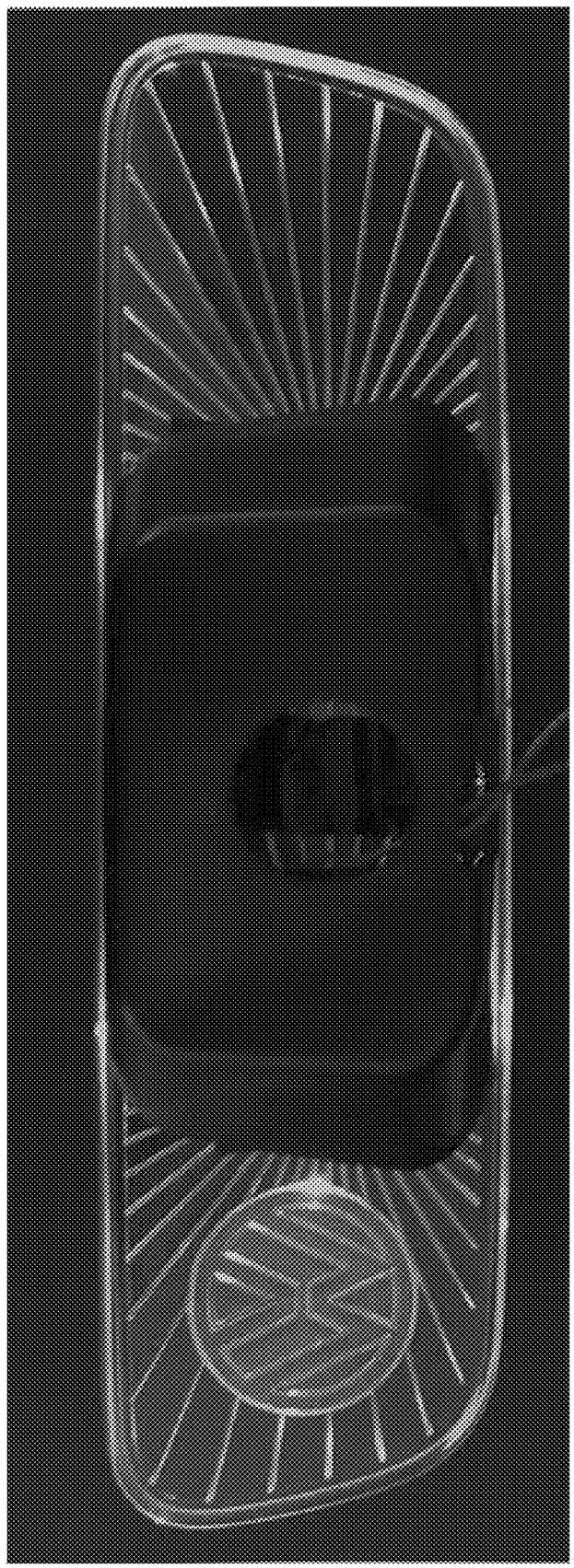
FIG. 21 is a rear plan view of another transparent frame and reflective element construction, showing an illuminated frame with patterns formed therein.
Figure 22:
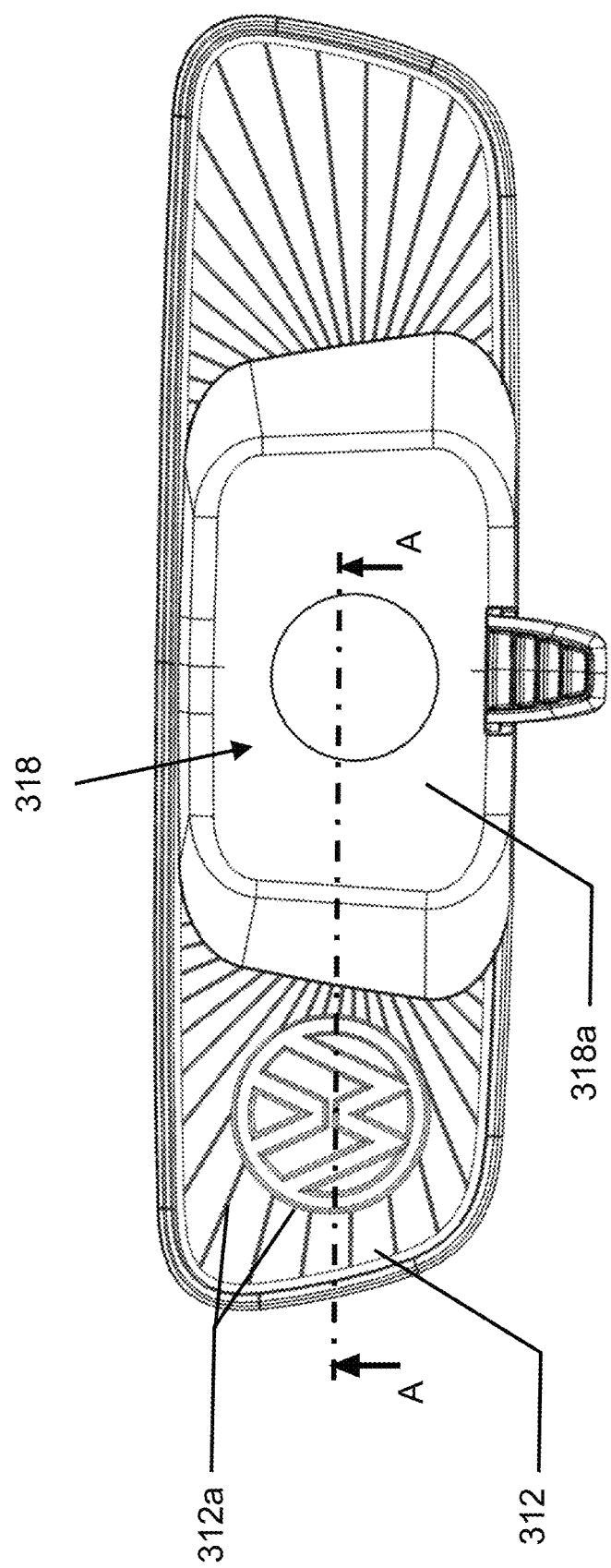
FIG. 22 is another rear plan view of the transparent frame and reflective element construction of FIG. 21.
Figure 22A:
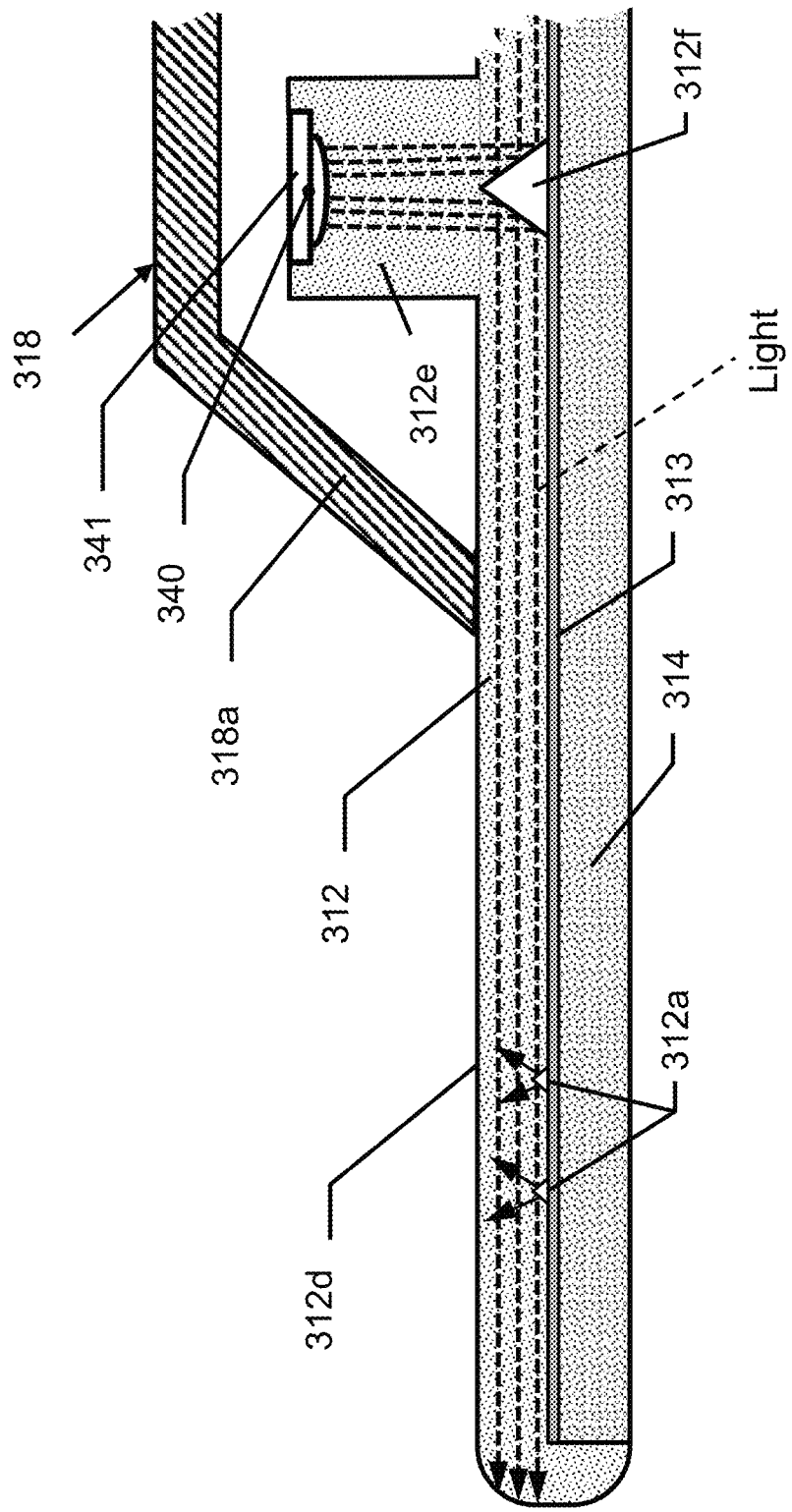
FIG. 22A is a sectional view of the transparent frame and reflective element construction, taken along the line A-A in FIG. 22.

Optionally, the transparent frame may provide a pattern such as a logo or icon or alphanumeric character or the like, with the pattern being illuminated by a light source to provide a glow or illumination of the pattern and/or a perimeter region of the frame. For example, and such as shown in FIGS. 21, 22 and 22A, a transparent frame 312 includes a patterned surface 312a and the mounting assembly or structure 318 includes an illumination source 340 (FIG. 22A) disposed within a housing 318a. The patterned bonding surface 312a provides enhanced bonding of the adhesive 313 at the frame 312 to attach the reflective element 314 to the frame, such as in a similar manner as discussed above.

In the illustrated embodiment, the illumination source 340 (such as a light emitting diode (LED) or the like) is disposed at a circuit element or circuit board 341 (FIG. 22A) disposed at a central region of the frame and at a protruding portion 312e of the frame (such as with the circuit element 341 received in a recess at the rearward end of the protruding portion 312e), with the frame having a larger channel or indent or notch 312f in front of the LED 340 to reflect light emitted by the LED in directions parallel to the front surface 312a and rear surface 312d of the frame. The notch 312f may comprise a conical-shaped notch so that light emitted by the LED 340 reflects radially outward from the conical-shaped notch to provide illumination along and around the periphery of the transparent frame 312. Optionally, one or more notches may be disposed in the path of the light emitted by the LED to provide the desired reflection and spreading of the light along and within the transparent frame. Optionally, the notch or notches may have a reflective coating or element disposed thereat to enhance reflection of the light along and within the transparent frame.

As shown in FIG. 22 the textured pattern at the front or bonding surface 312a of the transparent frame 312 includes notches or channels (that form the desired pattern or icon or logo) that are deep enough into the transparent frame so that light emitted by the LED 340 and reflected by the notch 312f is incident at the patterned notches, whereby the light is reflected and refracted so as to provide edge illumination of the texture or pattern. Thus, the texture or pattern is illuminated or glows when the LED 340 is electrically powered or activated or energized, such that a person viewing the transparent frame can see the illuminated pattern and icon or logo or the like. The LED 340 may be electrically powered or activated or energized responsive to a user input and/or to an ambient light sensor (where the LED is activated when the sensor determines that the ambient light level is below a threshold value) or the like.

Thus, and as best shown in FIG. 22A, light emitted by the LED 340 passes along the protrusion 312e so as to be incident at the surface of the notch 312f, whereby the light is reflected in directions generally parallel to the front and rear surfaces of the transparent frame. The protrusion 312e and/or the circuit element may include non-light transmitting features or light guiding features so that the light emitted by the LED is directed generally toward the notch 312f and not radially outward from the protrusion 312e. The light that is reflected by the notch 312f passes through and within the transparent frame in a direction generally parallel to the front and rear surfaces of the frame until the light is incident at the notches or patterned channels of the pattern or icon, whereby the light reflects and refracts so as to be visible at those areas to a person viewing the rear side 312d (FIG. 22A) of the transparent frame.

In the illustrated embodiment, the pattern comprises linear channels that are illuminated by light emitted by the LED, where the light may be guided along the linear channels to provide a glow along the channels. The icon or logo has channels formed that are transverse to the direction of the light passing along and within the transparent frame and thus may reflect and refract the light further to provide a greater intensity of illumination at the icon or logo as compared to the intensity of illumination along the linear channels. The depth of the notches or channels may be selected to provide a desired amount of illumination, and different portions of the pattern may comprise deeper channels or notches to provide portions where the illumination is greater than other areas of the pattern. Light that passes along and within the transparent frame that is not reflected or refracted by the notches or channels is visible at the periphery of the transparent frame to provide a circumferential glow around the perimeter of the frame. When the LED 340 is not electrically powered or energized, the pattern may still be visible through the transparent frame to a person viewing the rear surface of the transparent frame.

The illumination source or LED may comprise a white light-emitting LED or a monochromatic or colored light-emitting LED (such as a red light-emitting LED or blue light-emitting LED or green light-emitting LED or the like) to provide the desired appearance of the mirror frame, when the LED is electrically powered. Optionally, the LED may comprise a multi-colored LED that is electrically operable or energizable or powerable to emit a variety of colors responsive to a control input or power level at the LED, such that a user can select the color of light that is to be emitted by the LED for the desired or customized or personalized appearance of the mirror frame. Optionally, the transparent frame may be tinted or colored or the grooves or channels may be tinted or colored to provide a desired color effect to the mirror frame when the LED is powered.

The reflective element and mirror casing are adjustable relative to a base portion or mounting assembly to adjust the driver's rearward field of view when the mirror assembly is normally mounted at or in the vehicle. The sockets and ball members of the mounting structure may utilize aspects of the pivot mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. Publication No. US-2018-0297526, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or rounded perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. The interior prismatic reflective element may utilize aspects of the reflective elements and mirror assemblies described in U.S. Pat. Nos. 7,420,756; 7,338,177; 7,289,037; 7,274,501; 7,255,451; 7,249,860; 6,598,980; 6,318,870; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezeless reflective elements described in U.S. Pat. Nos. 7,626,749; 7,360,932; 7,289,037; 7,255,451; 7,274,501 and/or 7,184,190, which are all hereby incorporated herein by reference in their entireties.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, said vehicular interior rearview mirror assembly comprising:
   a transparent mirror frame, wherein the transparent mirror frame comprises a patterned front surface having a plurality of channels established thereat, and a rear surface opposite the patterned front surface;
   a mirror reflective element, wherein the mirror reflective element comprises a front surface and a rear surface opposite the front surface;
   wherein the mirror reflective element is attached at the patterned front surface of the transparent mirror frame via an adhesive disposed between the rear surface of the mirror reflective element and the patterned front surface of the transparent mirror frame;
   a mounting assembly attached at the rear surface of the transparent mirror frame and configured to mount the vehicular interior rearview mirror assembly at an interior portion of a vehicle; and
   wherein the patterned front surface of the transparent mirror frame comprises a pattern of grooves established thereat to allow air between the adhesive and the patterned front surface to escape when the mirror reflective element is being adhesively attached at the transparent mirror frame.

2. The vehicular interior rearview mirror assembly of claim 1, wherein the mirror reflective element comprises a prismatic reflective element, and wherein the mounting assembly includes a toggle mechanism.

3. The vehicular interior rearview mirror assembly of claim 1, comprising an illumination source disposed in a housing of the mounting assembly and operable to emit light, and wherein the patterned front surface of the transparent mirror frame is patterned to reflect and refract light emitted by the illumination source, when powered, so that an illumination pattern is visible to a person viewing the rear of the transparent mirror frame.

4. The vehicular interior rearview mirror assembly of claim 3, wherein the illumination source is disposed at a central region of the transparent mirror frame and light emitted by the illumination source, when powered, is reflected by a notch at the patterned front surface so that the reflected light passes along and within the transparent mirror frame in a direction parallel to the rear surface of the transparent mirror frame.

5. The vehicular interior rearview mirror assembly of claim 4, wherein the notch comprises a conical-shaped notch to radially reflect light in directions around the notch and parallel to the rear surface of the transparent mirror frame.

6. The vehicular interior rearview mirror assembly of claim 4, wherein the patterned front surface comprises an icon that is formed by channels that, when the illumination source is powered, reflect and refract light to illuminate the icon.

7. The vehicular interior rearview mirror assembly of claim 4, wherein some of the reflected light passing along and within the transparent mirror frame is reflected and refracted by notches or channels of the patterned front surface and some of the reflected light passes along and within the transparent mirror frame so as to illuminate a perimeter region of the transparent mirror frame.

8. The vehicular interior rearview mirror assembly of claim 1, wherein the transparent mirror frame comprises a perimeter lip that extend around a periphery of the patterned front surface, and wherein the perimeter lip circumscribes a peripheral edge of the mirror reflective element, and wherein the perimeter lip has an outer curved surface that provides a curved transition between a planar front surface of the mirror reflective element and a side surface of the transparent mirror frame, and wherein the perimeter lip does not overlap any part of the planar front surface of the mirror reflective element.

9. A vehicular interior rearview mirror assembly, said vehicular interior rearview mirror assembly comprising:
- a transparent mirror frame, wherein the transparent mirror frame comprises a patterned front surface, and a rear surface opposite the patterned front surface;
- a mirror reflective element, wherein the mirror reflective element comprises a front surface and a rear surface opposite the front surface;
- wherein the mirror reflective element is attached at the patterned front surface of the transparent mirror frame via an adhesive disposed between the rear surface of the mirror reflective element and the patterned front surface of the transparent mirror frame;
- a mounting assembly attached at the rear surface of the transparent mirror frame and configured to mount the vehicular interior rearview mirror assembly at an interior portion of a vehicle; and
- an illumination source disposed in a housing of the mounting assembly and operable to emit light, wherein the patterned front surface of the transparent mirror frame is patterned to reflect and refract light emitted by the illumination source, when powered, so that an illumination pattern is visible to a person viewing the rear of the transparent mirror frame.

10. The vehicular interior rearview mirror assembly of claim 9, wherein the mirror reflective element comprises a prismatic reflective element, and wherein the mounting assembly includes a toggle mechanism.

11. The vehicular interior rearview mirror assembly of claim 9, wherein the illumination source is disposed at a central region of the transparent mirror frame and light emitted by the illumination source, when powered, is reflected by a notch at the patterned front surface so that the reflected light passes along and within the transparent mirror frame in a direction parallel to the rear surface of the transparent mirror frame.

12. The vehicular interior rearview mirror assembly of claim 11, wherein the notch comprises a conical-shaped notch to radially reflect light in directions around the notch and parallel to the rear surface of the transparent mirror frame.

13. The vehicular interior rearview mirror assembly of claim 11, wherein the patterned front surface comprises an icon that is formed by channels that, when the illumination source is powered, reflect and refract light to illuminate the icon.

14. The vehicular interior rearview mirror assembly of claim 11, wherein some of the reflected light passing along and within the transparent mirror frame is reflected and refracted by notches or channels of the patterned front surface and some of the reflected light passes along and within the transparent mirror frame so as to illuminate a perimeter region of the transparent mirror frame.

15. The vehicular interior rearview mirror assembly of claim 9, wherein the transparent mirror frame comprises a perimeter lip that extend around a periphery of the patterned front surface, and wherein the perimeter lip circumscribes a peripheral edge of the mirror reflective element, and wherein the perimeter lip has an outer curved surface that provides a curved transition between a planar front surface of the mirror reflective element and a side surface of the transparent mirror frame, and wherein the perimeter lip does not overlap any part of the planar front surface of the mirror reflective element.

* * * * *